(12) United States Patent
Hotta et al.

(10) Patent No.: US 8,155,388 B2
(45) Date of Patent: Apr. 10, 2012

(54) IMAGE DISPLAY DEVICE AND IMAGE DISPLAY METHOD

(75) Inventors: Aira Hotta, Machida (JP); Takashi Sasaki, Yokohama (JP); Haruhiko Okumura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1070 days.

(21) Appl. No.: 12/043,467

(22) Filed: Mar. 6, 2008

(65) Prior Publication Data
US 2008/0240509 A1 Oct. 2, 2008

(30) Foreign Application Priority Data

Mar. 27, 2007 (JP) ................................. 2007-082015

(51) Int. Cl.
*G06K 9/00* (2006.01)
*G06K 9/32* (2006.01)
(52) U.S. Cl. ...................................... 382/107; 382/298
(58) Field of Classification Search ............ 345/30–111; 382/103
See application file for complete search history.

(56) References Cited

U.S. PATENT DOCUMENTS

| 5,506,912 A | * | 4/1996 | Nagasaki et al. ............. 382/103 |
| 6,188,518 B1 | * | 2/2001 | Martin ........................... 359/464 |
| 2002/0075199 A1 | * | 6/2002 | Asahi et al. ..................... 345/1.1 |
| 2007/0229557 A1 | | 10/2007 | Okumura et al. |

OTHER PUBLICATIONS

T. Sasaki, et al., "Development of Hyper-realistic Peripheral-visual-field Image Processing Using Distortion Perception Limit of Peripheral Vision", 3D3-4, IDW '06, 2006, pp. 1901-1904.

* cited by examiner

*Primary Examiner* — Alex Liew
(74) *Attorney, Agent, or Firm* — Oblon, Spivak, McClelland, Maier & Neustadt, L.L.P.

(57) ABSTRACT

An image display device includes a storage unit storing a plurality of conversion tables respectively expressing relationship of a position on a display area and an enlargement ratio of an image, a judging unit judging entire motion of an image, a selection unit selecting any of the plurality of conversion tables based on a result of the judgment, and a conversion unit converting the image based on the conversion table selected by the selecting unit.

18 Claims, 6 Drawing Sheets

IMAGE DISPLAY DEVICE AND IMAGE DISPLAY METHOD

CROSS-REFERENCE TO RELATED APPLICATIONS

This application is based upon and claims the benefit of priority from the prior Japanese Patent Application No. 2007-082015, filed on Mar. 27, 2007; the entire contents of which are incorporated herein by reference.

BACKGROUND OF THE INVENTION

1. Field of the Invention

The present invention relates to an image display device and an image display method.

2. Description of the Related Art

An art of processing an image with different enlargement ratios in accordance with spots is proposed (see T. Sasaki, A. Hotta and H. Okumura, "Development of Hyper-realistic Peripheral-visual-field Image Processing Using Distortion Perception Limit of Peripheral Vision", IDW'06,, pp 1901-1904 (2006)). In the art, the enlargement ratio is made small in the center area of an image, and the enlargement ratio is made large in the peripheral area of the image. As a result, the view angle is made large without increasing the amount of information, and a hyper-realistic image can be displayed.

BRIEF SUMMARY OF THE INVENTION

Here, from the study of the inventors, it is found that the sense of reality of a viewer differs depending on the entire motion of an image. For example, by the zoom operation and pan operation of the image pickup device at the time of capturing an image, the image is enlarged entirely and moved laterally. Such entire motion of the image has an influence on the sense of reality of a viewer.

An image display device according to one mode of the present invention includes a storage unit storing a plurality of conversion tables respectively expressing relationship of a position on a display area and an enlargement ratio of an image, a judging unit judging entire motion of an image, a selection unit selecting any of the plurality of conversion tables based on a result of the judgment, and a conversion unit converting the image based on the conversion table selected by the selecting unit.

An image display method according to one mode of the present invention includes judging entire motion of an image, selecting any of a plurality of conversion tables respectively expressing relationship of a position on a display area and an enlargement ratio of an image, based on a result of the judgment, and converting the image based on the selected conversion table.

DETAILED DESCRIPTION OF THE INVENTION

Hereinafter, embodiments of the present invention will be described in detail with reference to the drawings.

(First Embodiment)

Figure 1:
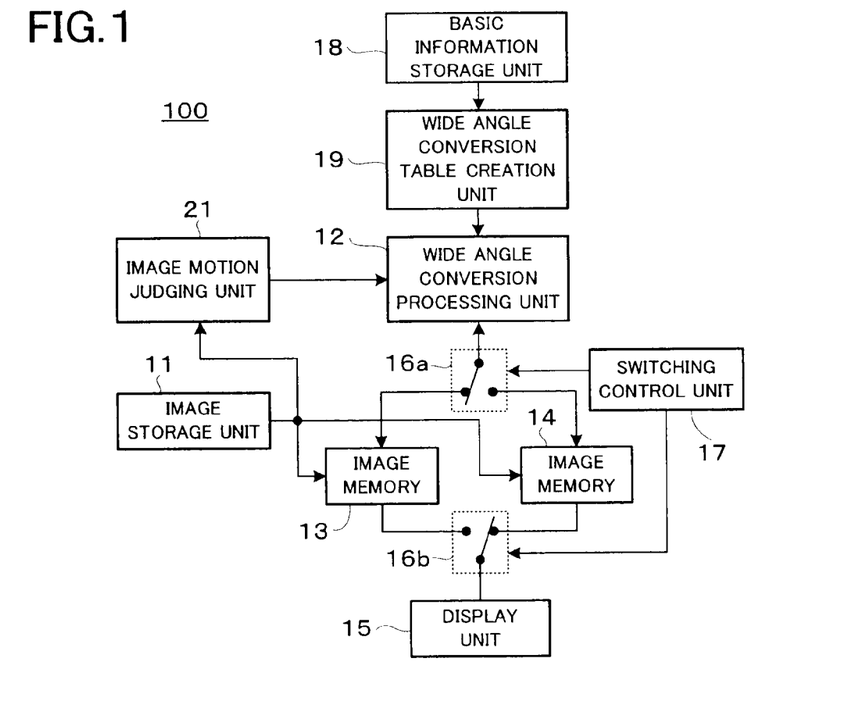
FIG. 1 is a block diagram showing an image display device according to a first embodiment.

FIG. 1 is a block diagram showing an image display device 100 according to a first embodiment of the present invention. The image display device 100 includes an image storage unit 11, a wide angle conversion processing unit 12, image memories 13 and 14, a display unit 15, changeover switches 16a, and 16b,, a switching control unit 17, a basic information storage unit 18, a wide angle conversion table creation unit 19 and an image motion judging unit 21.

The image storage unit 11 is a storage device such as hard disk and semiconductor memory, for example, and stores and outputs image (for example, moving image) information.

The wide angle conversion processing unit 12 holds wide angle conversion tables T1 to T4, switches these wide angle conversion tables T1 to T4, and applies wide angle conversion to the image outputted from the image storage unit 11.

The wide angle conversion processing unit 12 functions as a storage unit which stores a plurality of conversion tables corresponding to a plurality of enlargement ratio characteristics expressing the relationship of the positions on the display area and the enlargement ratios of the image. The wide angle conversion processing unit 12 functions as a selection unit which selects any of a plurality of conversion tables based on the judgment result of the entire motion of the image. The wide angle conversion processing unit 12 functions as a conversion unit which converts an image based on the selected conversion table.

In the wide angle conversion tables T1 to T4, coordinates P0 (x0, y0) of the pixel before conversion and coordinates P1 (x1, y1) after conversion are shown to correspond to each other as in the formula (9) which will be described later. The wide angle conversion tables T1 to T4 correspond to enlargement ratio characteristic curves D1 to D4 which will be described later. Based on the judgment result in the image motion judgment unit 21, the wide angle conversion tables T1 to T4 are switched, and the storage contents of the image memories 13 and 14 are rewritten, whereby wide angle conversion is performed.

The wide angle conversion processing unit 12 changes the positions of the pixels constituting the image on the image memories 13 and 14 based on the formula (9), and thereby, performs wide angle conversion of the image. The wide angle conversion processing unit 12 reads data from the image memories 13 and 14, and writes the date therein. By controlling the addresses at the time of reading and the addresses at the time of writing, wide range conversion is executed. This is because the addresses on the image memories 13 and 14 correspond to the positions of the pixels. Hence, the wide angle conversion is a kind of address conversion, and can be executed at a relatively high speed (for example, in real time).

Correspondence of a pixel before and after conversion is not always one to one. When the image is enlarged, a single pixel before conversion can be made to correspond to a plurality of pixels after conversion. If the correspondence of the pixels before and after conversion is one to one when an image is enlarged, the pixels which do not correspond to the pixels before conversion are present among the pixels after conversion. Specifically, the pixels after conversion are disposed in a dotted form on a display area Ad (missing pixels seemingly occur), and this is not favorable for observation.

When an image is reduced, a plurality of pixels before conversion are likely to correspond to a single pixel after conversion. It is conceivable that the number of pixels decreases with reduction of the image due to the resolution of the display area Ad. However, decrease in the number of pixels after conversion is not favorable because it reduces the resolution of the image. As will be described later, reduction in resolution can be prevented by making the density (definition) of the pixels which can be displayed on the display area Ad sufficiently high.

The image memories 13 and 14 are storage devices for storing images, for example, semiconductor memories, and function as a plurality of storage units which store image data to be converted. Since the images stored in the image memories 13 and 14 are displayed on the display unit 15, wide angle conversion of the images is performed by the wide angle conversion processing unit 12 rewriting the storage contents of the image memories 13 and 14. The image memories 13 and 14 are switched with the changeover switches 16a and 16b,, and alternately used for wide angle conversion and display. Therefore, the present image and the image from one frame before are alternately inputted in the image memories 13 and 14.

The display unit 15 is a display device which displays an image. Any of direct-view type display devices (for example, a CRT, a liquid crystal display device, and a plasma display), and a projection type display device (for example, a projector) can be used for the display unit 15. The display unit 15 has the display area Ad on which the wide angle conversion image stored in the image memories 13 and 14 is displayed. In the case of the projection type display device, the display area Ad is a so-called screen.

Figure 2:
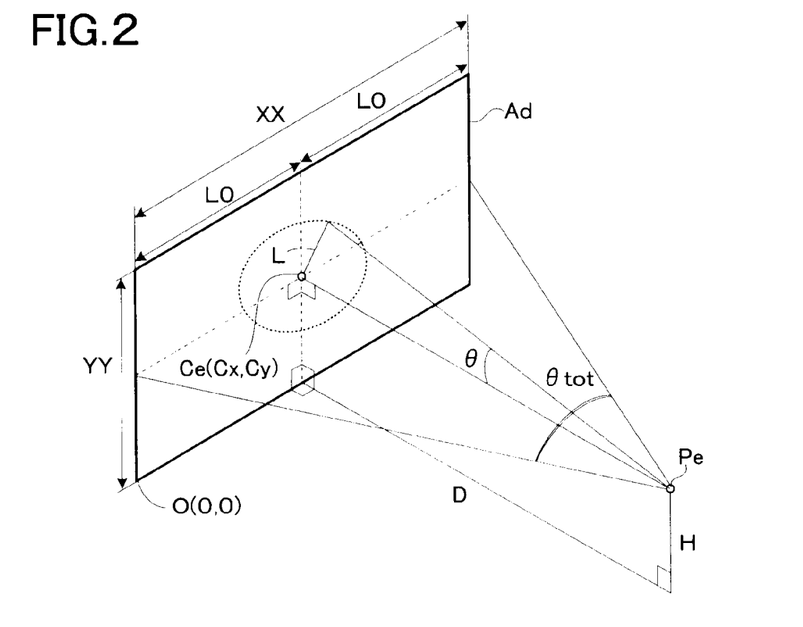
FIG. 2 is a schematic view showing relationship of a display area of a display unit and a view point of a viewer.

FIG. 2 is a schematic view showing the relationship of the display area Ad of the display unit 15 and a viewpoint Pe of a viewer. The display area Ad is a substantially rectangular plane area with a relatively large area with dimensions of length and width of YY and XX (=2*L0), and a sight line center Ce (Cx, Cy) is disposed in it. The viewpoint Pe of a viewer is located in the middle of both the eyes of the viewer, is the point to be the reference of the field of view of the viewer, and is disposed in the position at a distance D from the display area Ad and at a height H.

Here, a view angle θtot of the viewer with respect to the display area Ad is expressed by the following formula (1).

$$\theta tot = 2*\tan^{-1}(L0/D)$$
$$= 2*\tan^{-1}(XX/(2*D))$$
formula (1)

In this case, the view angle in the lateral direction of the display area Ad is set to be larger than the view angle in the vertical direction of the display area Ad, and the view angle θtot is calculated from the dimension XX in the lateral direction of the display area Ad.

When the view angle in the vertical direction of the display area Ad is larger than the view angle in the lateral direction of the display area Ad, the view angle θtot of the viewer with respect to the display area Ad is expressed by the following formula (2).

$$\theta tot = 2*\tan^{-1}(YY/(2*D))$$
formula (2)

The sight line center Ce is in the position of the sight line of the viewer (center of the field of view) on the display area Ad. The sight line center Ce is determined by the positional relationship of the display area Ad and the viewer, and is disposed right in front of the viewpoint Pe of the viewer. In this example, the sight line center Ce is disposed in the lateral center of the display area Ad. When the lower left corner of the display area Ad is set as an origin O (0, 0), the relationship of the following formula (3) is established.

$$Cx=L0=XX/2$$

$$Cy=H$$
formula (3)

Here, the enlargement ratio D differs depending on the positions on the display area Ad. More specifically, the enlargement ratio D of the image changes in accordance with the distance L from the sight line center Ce, or the angle θ. The difference of the enlargement ratio D on the display area Ad is the result of the wide angle conversion in the wide angle conversion processing unit 12.

Figure 3:
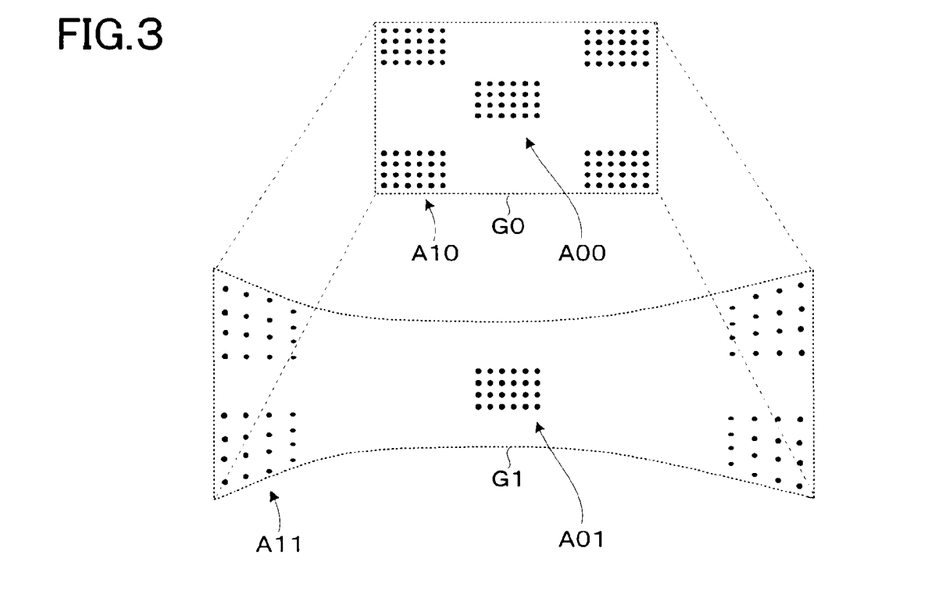
FIG. 3 is a schematic view showing images before and after wide angle conversion processing in a wide angle conversion processing unit in correspondence with each other.

FIG. 3 is a schematic view showing images G0 and G1 before and after wide angle conversion processing in the wide angle conversion processing unit 12 in correspondence with each other. The enlargement ratio is low (for example, the enlargement ratio is 1, or lower) in the areas A00 and A01 in the central portion (in the vicinity of the sight line center Ce) of the image. On the other hand, the enlargement ratio is high (for example, the enlargement ratio is 1, or higher) in the peripheral portions A10 and A11 of the image. Specifically, the resolution of the image is high in the central portion, whereas the image is extended in the peripheral portion.

The reason why the enlargement ratio differs depending on the spots is as follows. The resolution of the human visual sense (distortion perception limit) is high in the center field of view, but is low in the peripheral field of view. By using this, sense of reality can be enhanced with simple image processing. Specifically, by concentrating the information which is displayed on the important spot (central portion of the field of view) in the human visual sense (enhancing density of information, namely, the resolution), sense of hyper-reality and effective use of information can be both realized.

The central portion of the image is reduced and displayed as above. This can be the cause of degradation of resolution in the central portion of the display area Ad. Specifically, there is the fear that the reduced image is not clearly displayed due to the limit of the definition in the display area Ad.

Here, by enhancing the definition in the central portion of the display area Ad of the display unit 15, the resolution in the central portion can be made favorable.

However, it is proper that the resolution itself in the hardware of the display area Ad of the display unit 15 is the same in the central portion and the peripheral portion. For example, when the image outputted from the image storage unit 11 is an NTSC image, and the resolution of the display area Ad of the display unit 15 is HDTV-compatible, the resolution in the display area Ad is about twice as high as the resolution of the display image itself both horizontally and vertically. Therefore, even if the central portion is reduced to a half (the density of the pixels is doubled), the pixels with doubled density can be displayed on the display area Ad.

Thus, when the resolution of the display area Ad is higher than the resolution of the display screen, the central portion of the display area Ad is reduced, and the resolution can be enhanced. In this case, the display area Ad can be divided into a first area which encircles the visual line center Ce and has a first resolution, and a second area which encircles the first area and has a second resolution lower than the first resolution.

The changeover switches 16a, and 16b, are for switching the image memories 13 and 14 for wide angle conversion and display. The changeover switch 16a, is a switch for selecting which one of the image memories 13 and 14 is used for wide angle conversion processing. The image memory 13 or 14 which is connected to the wide angle conversion processing unit 12 by the changeover switch 16a, becomes the target of the wide angle conversion processing. The image memory 13 or 14 which is connected to the display unit 15 by the changeover switch 16b, becomes the target of image display. By operation of the changeover switches 16a, and 16b,, the image memories 13 and 14 for wide angle conversion and display are switched.

The switching control unit 17 controls the timing of switching display (frame). The switching control unit 17 controls the changeover switches 16a, and 16b, at a predetermined period (frame timing). During this switching, wide angle conversion processing in the image memories 13 and 14 is executed.

The basic information storage unit 18 stores the information which is the basis of the wide angle conversion processing such as the size (YY, XX) of the display area Ad, and the position of a viewer with respect to the display area Ad (the distance D, the height H).

The wide angle conversion table creation unit 19 creates the wide angle conversion tables T1 to T4 which are used in the wide angle conversion processing in the wide angle conversion processing unit 12 based on the enlargement ratio characteristic curves D1 to D4 which will be described later. The details will be described later.

The image motion judging unit 21 judges the entire motion of the image by using a motion vector of the image, and functions as the judging unit which judges the entire motion of the image. The details of the judgment will be described later.

The entire motion of an image can be divided into reduction and enlargement of the image and movement of the image. The enlargement and reduction of the image is caused by a zoom (zoom-in, zoom-out) operation of optically enlarging and reducing a imaged subject with a image pickup device (camera), and a dolly operation of moving the image pickup device to the front and the rear of the imaged subject. These operations shall be called a zoom operation in a broad sense.

Movement of an image can occur by a pan operation which changes the angle of a camera laterally, a tilt operation which changes the angle of the camera vertically, a track operation which moves the camera laterally, a boom operation which moves the camera vertically, and the combination of them. These operations shall be called a pan operation in a broad sense.

The entire motion of the image does not occur only by the operation (camera work) with the image pickup device, but it also can occur by the image processing and the like after pickuping the image.

(Operation of Image Display Device 100)

An operation of an image display device 100 will be described.

Figure 4:
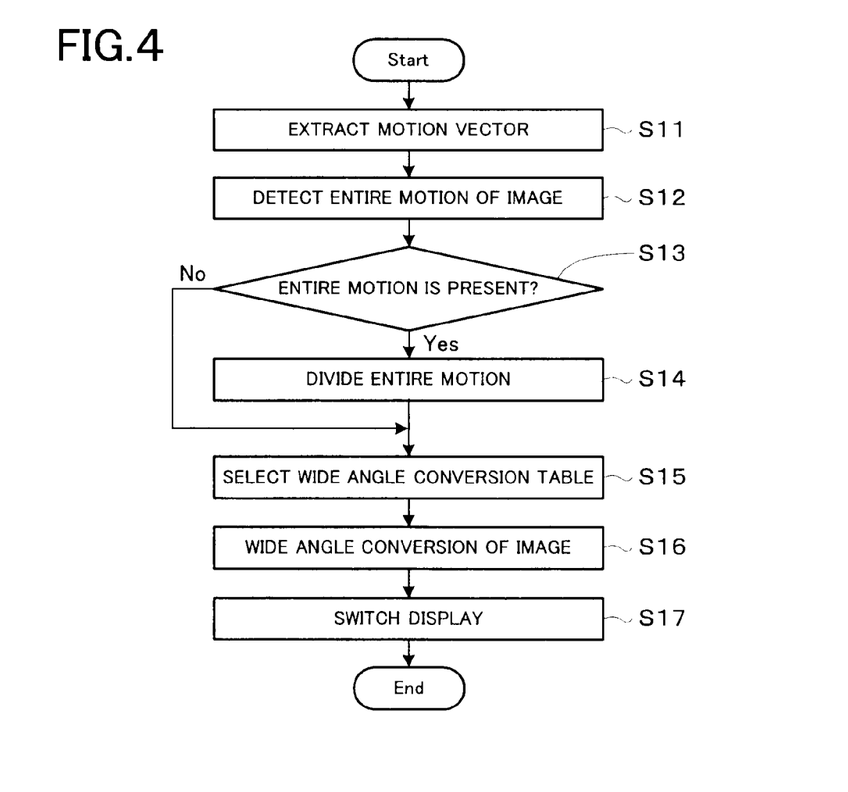
FIG. 4 is a flowchart showing one example of an operation procedure of the image display device.

FIG. 4 is a flowchart showing one example of an operation procedure of the image display device 100. Steps S11 to S14, S15 to S16 and S17 in the drawing are respectively executed by the image motion judging unit 21, the wide angle conversion processing unit 12 and the switching control unit 17.

(1) Extraction of Motion Vector (Step S11)

The image motion judging unit 21 extracts a motion vector from an image signal outputted from the image storage unit 11.

A motion vector is a vector which expresses motion from a frame which is the reference (image corresponding to a certain moment of a moving image) when the image is a moving image. By comparing frames, motion vectors are extracted. More specifically, a frame is divided into blocks, and a relative position between the blocks where a difference from the previous frame becomes the smallest is a motion vector. Many image signals (for example, MPEG2) include the information of motion vectors from the relation with image compression, and therefore, motion vectors can be easily extracted.

(2) Detection of Entire Motion of Image (Step S12)

The image motion judging unit 21 detects the entire motion of an image. The motion of an image includes two kinds of motions that are entire motion of the image due to an operation or the like with an image pickup device (camera work), and a partial motion of the image due to movement or the like of the subject in an image. Both of them can be divided based on the ratio of the scalar quantity of the motion vector in the frame being other than zero (threshold value or larger). If the entire motion of the image is present, the ratio of the scalar quantity of the motion vector being other than zero becomes large. As a result, the ratio of the motion vectors in which the motion vectors become a predetermined threshold value or larger is calculated, and if the ratio is larger than the reference value, the entire motion of the image is judged as present.

(3) Division of Entire Motion of Image (Steps S13 and S14)

Presence or absence of the entire motion of the image is judged in step S13, and when the judgment result is Yes, the entire motion of the image is divided. For example, an average value of the motion vectors in the frame is calculated. When the average value is smaller than the reference value, it is judged that the image is entirely reduced or enlarged. On the other hand, when the average value is the reference value or larger, it is judged that the image is entirely moved.

When the image is entirely enlarged or reduced, the directions of the motion vectors are relatively uniformly distributed, and therefore, the average value of them is close to zero. When the image is entirely moved on the other hand, the directions of the motion vectors are identical, and therefore, the average value of them is a value corresponding to the moving speed.

(4) Selection of Wide Angle Conversion Table (Step S15)

Based on the division of the entire motion of the image, the wide angle conversion tables T1 to T4 are selected. More specifically, the wide angle conversion table is selected as follows.

1) When the Entire Motion of the Image is Absent

The wide angle conversion table T1 is selected. The wide angle conversion table T1 corresponds to the enlargement ratio characteristic curve D1 in which the dependence of the enlargement ratio D on the relative distance Lr is the smallest among the enlargement ratio characteristic curves D1 to D4. The enlargement ratio characteristic curve D1 corresponds to an allowable magnification E which is the limit of the enlargement ratio which a viewer does not mind in the normal state.

2) When the Image is Entirely Enlarged or Reduced

Any one of the wide angle conversion tables T2 to T4 is selected. The wide angle conversion tables T2 to T4 correspond to the enlargement ratio characteristic curves D2 to D4 in which the dependence of the enlarge ratio D on the relative distance Lr is relatively large. It is conceivable to select the wide angle conversion table of the enlargement ratio characteristic curve in which the dependence of the enlargement ratio D on the relative distance Lr is larger, in correspondence with the speed of enlargement or reduction of the image.

3) When the Image is Entirely Moved

In this case, the wide angle conversion table T1 or T2 is selected in accordance with whether the view angle θtot of the viewer is larger than the reference value (for example, 70°) or not. When the view angle θtot is smaller than the reference value, the wide angle conversion table T1 is selected. When the view angle θtot is the reference value or larger on the other hand, the wide angle conversion table T2 is selected.

(5) Wide Angle Conversion Processing (Step S16)

Based on the selected wide angle conversion table T, wide angle conversion processing is performed. The image data outputted from the image storage unit 11 is inputted into the wide angle conversion processing unit 12, and the image memories 13 and 14. The newest image data is stored in one of the image memories 13 and 14, and the image data of one frame before is stored in the other one. The wide angle conversion processing unit 12 performs wide angle conversion of the newest image data stored in one of the image memories 13 and 14. The image data of one frame before, which is stored in the other one of the image memories 13 and 14 is already subjected to wide angle conversion, and is displayed in the display unit 15.

(6) Switching of Display (Step S17)

The switching control unit 17 controls the changeover switches 16a, and 16b, and thereby, wide angle conversion and display in the image memories 13 and 14 are switched. The switching corresponds to the output of a new image from the image storage unit 11. Specifically, updating of the frame of the image and switching of wide angle conversion/display are linked to each other, and thereby, continuous wide angle conversion and display of the image are performed.

(Details of Wide Angle Conversion Processing)

Hereinafter, the details of the wide angle conversion processing will be described.

Figure 5:
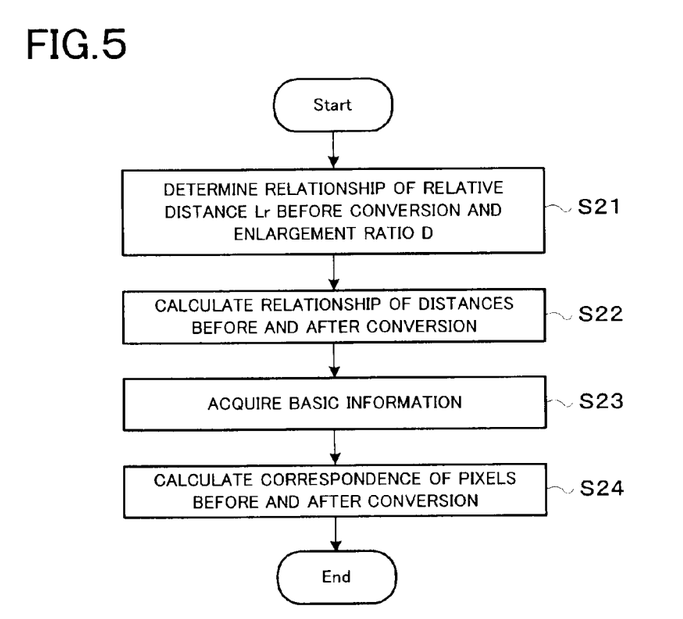
FIG. 5 is a flowchart showing one example of a creation procedure of a wide angle conversion processing table.

FIG. 5 is a flowchart showing one example of a creation procedure of the wide angle conversion processing table.

(1) Determination of the Relationship of the Relative Display Position (Relative Distance) Before Conversion and the Enlargement Ratio (Step S21)

Figure 6:
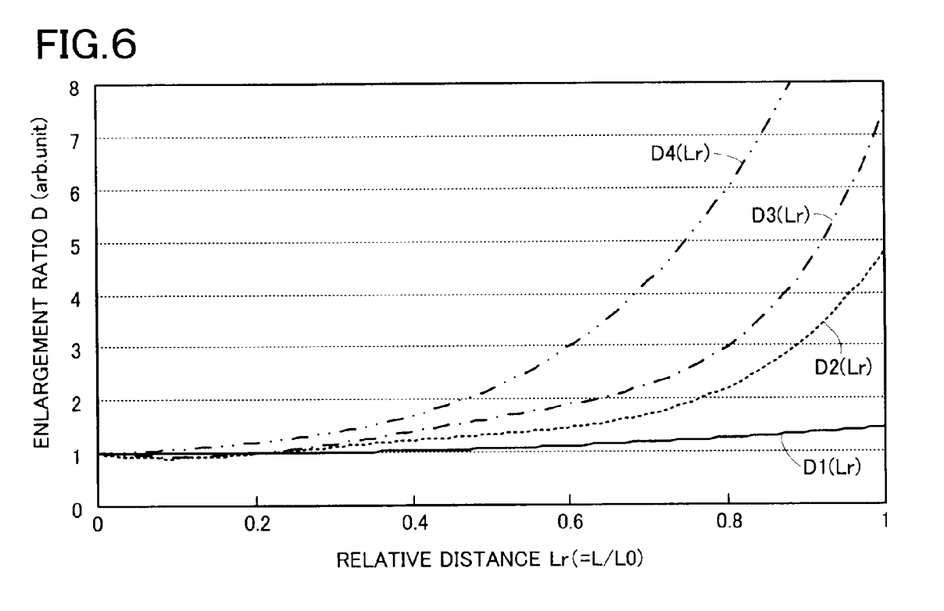
FIG. 6 is a graph showing relationship of a relative distance Lr from a sight line center Ce and enlargement ratios D1 to D4.
Figure 7:
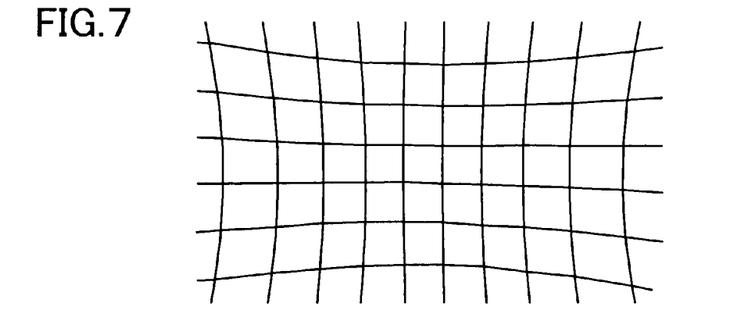
FIG. 7 is a schematic view showing a result of wide angle conversion with a wide angle conversion table T1 corresponding to an enlargement ratio characteristic curve D1.
Figure 8:
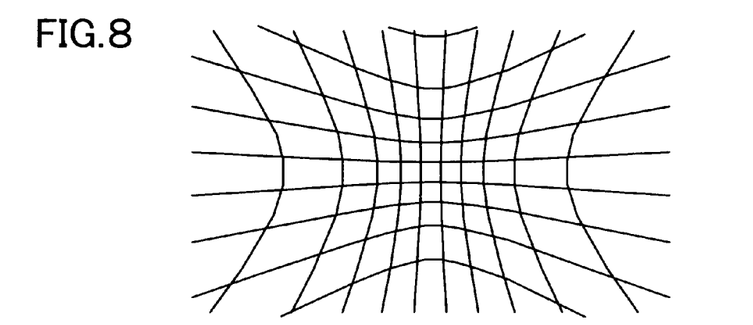
FIG. 8 is a schematic view showing a result of wide angle conversion with a wide angle conversion table T2 corresponding to an enlargement ratio characteristic curve D2.
Figure 9:
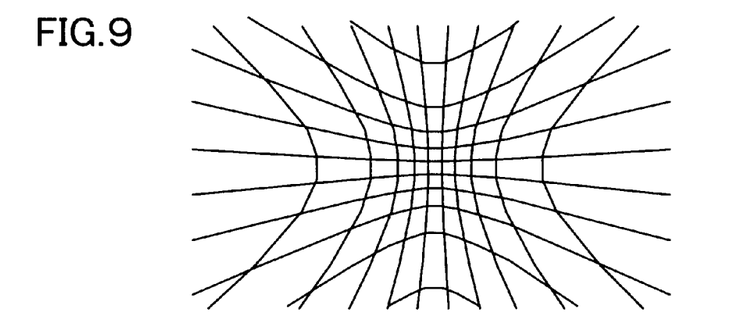
FIG. 9 is a schematic view showing a result of wide angle conversion with a wide angle conversion table T3 corresponding to an enlargement ratio characteristic curve D3.
Figure 10:
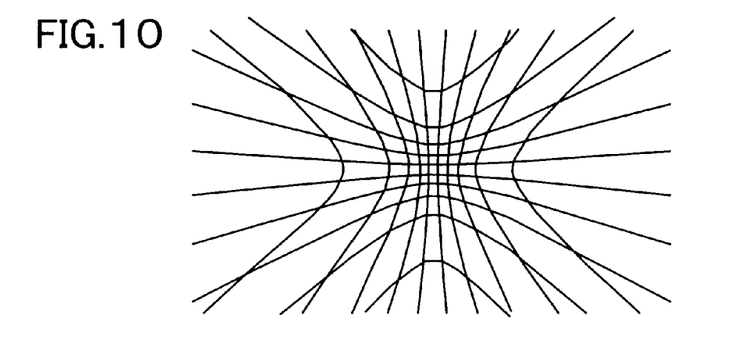
FIG. 10 is a schematic view showing a result of wide angle conversion with a wide angle conversion table T4 corresponding to an enlargement ratio characteristic curve D4.

FIG. 6 is a graph showing the relationship of the position on the display area Ad (in this case, the relative distance Lr from the sight line center Ce) and the enlargement ratios D1 to D4 (the enlargement ratio characteristic curves D1 (Lr) to D4 (Lr)). Further, FIGS. 7 to 10 are schematic views showing the results of the wide angle conversion with the wide angle conversion tables T1 to T4 corresponding to the enlargement ratio characteristic curves D1 (Lr) to D4 (Lr). More specifically, FIGS. 7 to 10 show the results of image processing of the lattice pattern by the enlargement ratio characteristic curves D1 to D4.

As shown in the following formula (4), the relative distance Lr is the result of standardizing the distance L from the sight line center Ce with the ½, (L0) of the lateral side of the display area Ad.

$$Lr = L/L0 \quad \text{formula (4)}$$

Specifically, the relative distances Lr=0, and 1 respectively correspond to the sight line center Ce and the border (end) of the display area Ad.

A graph in FIG. 6 (enlargement ratio characteristic curves D1 (Lr) to D4 (Lr)) is expressed by, for example, the following formula (5).

$$D1(Lr) = 0.8\, Lr^2 - 0.3\, Lr + 1$$

$$D2(Lr) = 20.8\, Lr^4 - 30.8\, Lr^3 + 16.0\, Lr^2 - 2.2\, Lr + 1.0$$

$$D3(Lr) = 39.0\, Lr^5 - 57.3\, Lr^4 + 23.4\, Lr^3 + 2.3\, Lr^2 - 1.0\, Lr + 1.0$$

$$D4(Lr) = 10.4\, Lr^4 - 2.1\, Lr^3 + 2.1\, Lr^2 + 0.6\, Lr + 1.0 \quad \text{formula (5)}$$

With increase in the relative distance Lr, the enlargement ratio Di(Lr) gradually increases (subscript i: an integer, i=1 to 4). When the subscript i increases, the dependence of the enlargement ratio Di on the relative distance Lr becomes large. As a result, for example, the enlargement ratio characteristic curves D1 and D2 are placed as the first enlargement ratio characteristic having the first enlargement ratio with respect to a predetermined relative distance, and the second enlargement characteristic having the second enlargement ratio larger than the above described first enlargement ratio with respect to the above described relative distance, respectively.

In the enlargement ratio characteristic curve D1 (Lr), the enlargement ratio D is smaller than 1.5, in all the areas with Lr=0 to 1. On the other hand, in the enlargement ratio characteristic curve D2 (Lr), at the point with the relative distance Lr of about 0.6,, the entire area is divided into the range with the enlargement ratio D smaller than 1.5, and the range with the enlargement ratio D larger than 1.5.

Here, from the study of the inventors, it has been found that the influence exerted onto the sense of reality of a viewer by the peripheral enlargement ratio (enlargement ratio characteristic curve D (Lr)) differs depending on the entire motion of the image. Specifically, by switching the enlargement ratio characteristic curve D(Lr) in accordance with the entire motion of the image, the sense of reality of a viewer can be more enhanced.

Figure 11:
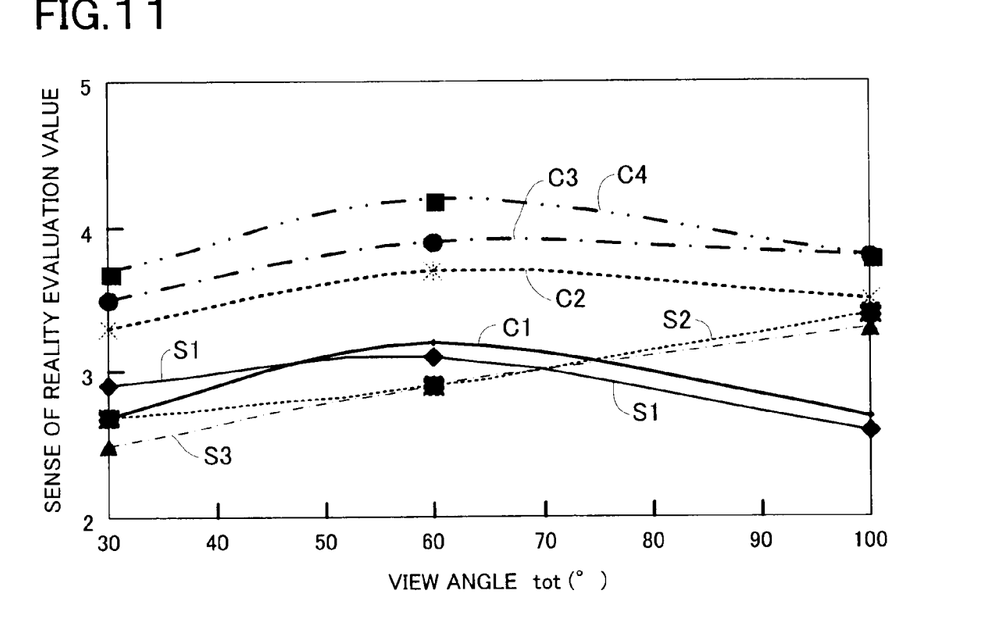
FIG. 11 is a graph showing relationship of the enlargement ratio characteristic curves D1 to D4 and a view angle θtot, and an evaluation value of sense of reality.

FIG. 11 is a graph showing the relationship of the enlargement ratio characteristic curves D1 to D4 and the view angle θtot, and the evaluation value of the sense of reality.

FIG. 11 shows the result of the test subject evaluating the case in which the image is enlarged entirely (forward-moving image which is the image moving forward), and the case in which the image moves laterally as a whole (the pan image which is the image rotating in the lateral direction), respectively. Change in the sense of reality was evaluated by presenting the images with the enlargement ratio of the images changed to the test subject in these forward-moving image and pan image. Graphs C1 to C4 respectively correspond to the enlargement ratio characteristic curves D1 to D4 in the forward-moving image. Graphs S1 to S3 respectively correspond to the enlargement ratio characteristic curves D1 to D3 in the pan image.

As shown in FIG. 11, in the forward-moving image, the sense of reality is enhanced in the sequence of the enlargement ratio characteristic curves D1 to D4 (graphs C1 to C4), and the sense of reality of the image which is processed by the enlargement ratio characteristic curve D with the large enlargement ratio D becomes high even with the view angle θtot of 30°. Meanwhile, in the pan image, at the view angle θtot of the reference value (about 70°), the enlargement ratio characteristic curve with large sense of reality changes (graphs S1 to S3). When the view angle θtot is smaller than the reference value, large sense of reality is obtained with the enlargement ratio characteristic curve D1. When the view angle θtot is larger than the reference value, large sense of reality is obtained with the enlargement ratio characteristic curve D2.

The result shows that in order to provide a hyper-realistic image, the enlargement ratio characteristic curves D1 to D4, the wide-angle conversion tables T1 to T4 in its turn are preferably switched as follows. In the forward motion, an image is processed by using the enlargement ratio characteristic curves D2 to D4 even when the view angle θtot is small. In the pan image, the enlargement ratio characteristic curves D1 is used when the view angle θtot is smaller than the reference value, and the enlargement ratio characteristic curves D2 to D4 are used when the view angle θtot is larger than the reference value.

The above result corresponds to enlargement, and lateral movement of the image. For the following reason, this result can be applied to the other cases. It is conceivable that when an image is reduced entirely (rearward-moving image that is an image moving in the rearward direction), sense of reality is enhanced depending on the amount of motion of the peripheral area of the image as when the image is enlarged. The case in which the image moves in the vertical direction and the diagonal direction can be considered to be similar to the motion in the lateral direction of the image.

(2) Calculation of Distance Relation Before and After Conversion (Step S22)

Since the enlargement ratio differs depending on the spots, a distance Lact from the sight line center Ce after wide angle conversion is calculated by integrating E(Lr) by the relative distance Lr.

$$Lact(Lr) = \int_{Lr=0}^{LR=1} [Di(Lr)] dLr \qquad \text{formula (6)}$$

The formula (6) expresses the relationship of the relative distances Lr of the image before and after conversion.

(3) Acquisition of Basic Information (Wide Angle Conversion Basic Information) (Step S23)

Wide angle conversion processing basic information is acquired. The wide angle conversion processing basic information will be shown hereinafter.

<Display Area Ad and Distance D from Viewer>

The information of the distance D can be inputted by an input device such as a keyboard. The distance D may be detected by a sensor. The distance D can be detected based on the time after an ultrasonic wave or an infrared ray is emitted until it is reflected at a viewer and returns. As a result, from the formula (1) to the formula (3), the sight line center Ce (Cx, Cy) and the view angle θtot are calculated.

(4) Calculation of Correspondence of Pixels Before and After Conversion (Step S24)

The correspondence of the pixels before and after conversion is calculated. Specifically, the wide angle conversion table in the horizontal and the vertical direction is created.

The relationship between the coordinates P0 (X0, Y0) of the pixel before conversion and the coordinates P1 (X1, Y1) of the pixel after conversion is expressed by the following formula (7).

$$P1 - Ce = L0 * Lact(|P0 - Ce|/L0) * \qquad \text{formula (7)}$$
$$(P0 - Ce)/|P0 - Ce||P0 - Ce|$$
$$= ((X0 - Cx)^2 + (Y0 - Cy)^2)^{1/2}$$

When the formula (7) is decomposed with respect to the X coordinate and Y coordinate, the following formula (8) is obtained.

$$X1 - Cx = L0 * Lact(|P0 - Ce|/L0) * \qquad \text{formula (8)}$$
$$(X0 - Cx)/|P0 - Ce|Y1 - Cy$$
$$= L0 * Lact(|P0 - Ce|/L0) *$$
$$(Y0 - Cy)/|P0 - Ce|$$

The formula (8) can be expressed by formula (9) as follows (i=1~4).

$$X1 = Fxi, (X0, Y0)$$
$$Y1 = Fyi, (X0, Y0) \qquad \text{formula (9)}$$

The formula (9) expresses the substantial content of the wide angle conversion processing tables T1 to T4. By converting the coordinates P0 (X0, Y0) of the pixel by switching the wide angle conversion tables T1 to T4, the coordinates P1 (X1, Y1) of the pixel after conversion is obtained. The wide angle conversion processing table may be any of the formula itself, or the table expressing the correspondence between the components of the formula.

(Second Embodiment)

Figure 12:
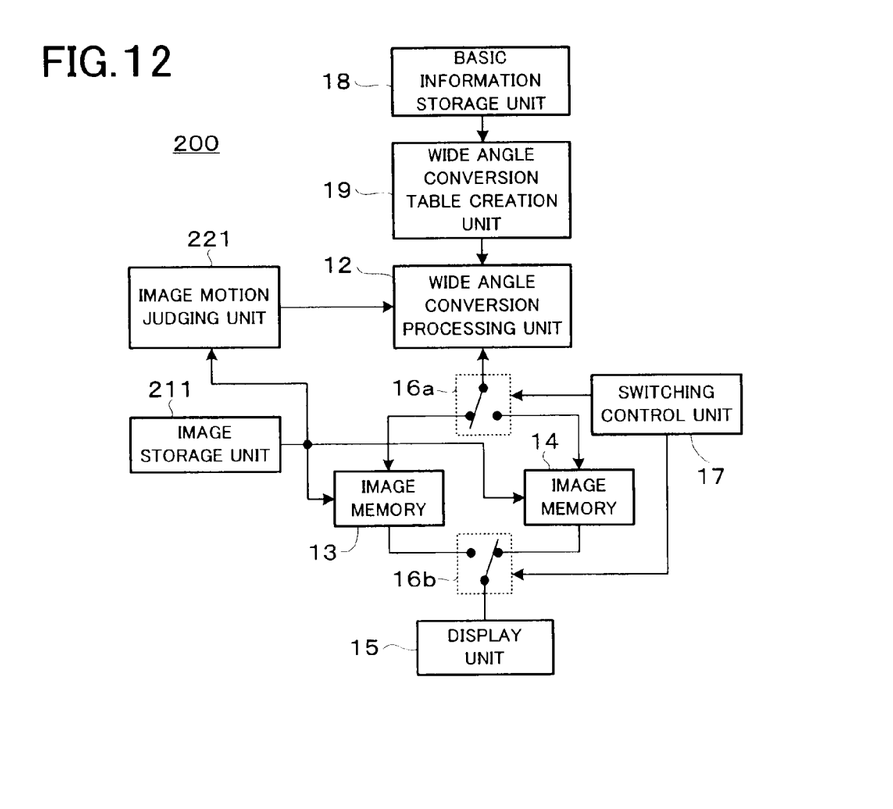
FIG. 12 is a block diagram showing an image display device according to a second embodiment.

FIG. 12 is a block diagram showing an image display device 200 according to a second embodiment of the present invention. An image storage unit 211 is a storage device such as a hard disk, and a semiconductor memory, for example, and stores and outputs image (for example, moving image) information. The image information stored in the image storage unit 211 contains image pickup information. The image pickup information expresses the operation in the image pickup device which pickups an image, such as a zoom operation and a pan operation.

An image motion judging unit 221 judges the entire motion of an image by using the image pickup information.

In the other points, the image display device 200 does not essentially differ from the image display device 100, and therefore, the detailed description of them will be omitted.

(Third Embodiment)

Figure 13:
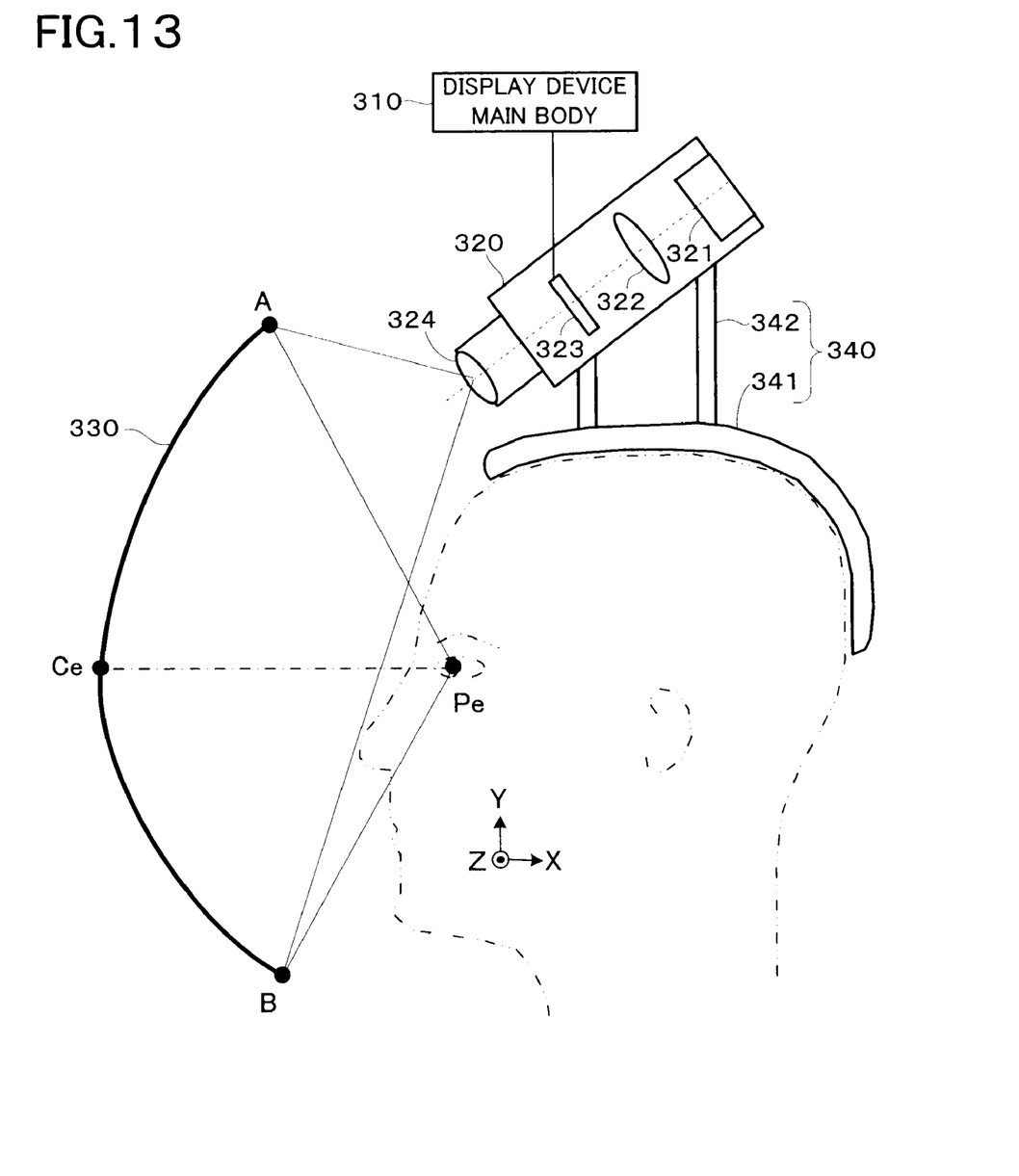
FIG. 13 is a block diagram showing an image display device according to a third embodiment.

FIG. 13 is a block diagram showing an image display device 300 of a third embodiment of the present invention. The image display device 300 is constituted of a display device main body 310, a projector 320, a curved screen 330 and a holing unit 340.

The display device main body 310 includes the same components as the image storage unit 11, the wide angle conversion processing unit 12, the image memories 13 and 14, the changeover switches 16a, and 16b,, the switching control unit 17, the basic information storage unit 18, the wide angle conversion table creating unit 19, and the image motion judging unit 21 in the first embodiment. Specifically, the image display device 300 can be considered to adopt the projector 320, the curved screen 330 and the holding unit 340 in place of the display unit 15 of the image display device 100 in the first embodiment.

The projector 320 has a light source 321, a collimator lens 322, a display element 323 and a projection lens 324, and projects an image onto the curved screen 330.

The light source 321 generates projection light which projects the image on the display element 323 onto the curved screen 330.

The collimator lens 322 converts light emitted from the light source 321 into parallel light.

The display element 323 is an element which generates an image to be projected onto the curved screen 330, for example, a liquid crystal display element. The display element 323 functions as an image display unit which displays an image.

The projection lens 324 is an optical element for projecting an image on the display element 323 onto the curved screen 330. The projection lens 324 functions as an image projecting unit which projects a displayed image. As the projection lens 324, a lens (for example, a fisheye lens) which can project an image at a wide angle even when the projection distance is a short distance can be used.

The curved screen 330 is for projecting the image projected from the projector 320 at a wide view angle. The surface of the curved screen 330 is constituted of a scattering surface having reflection properties having a scattered light peak in the regular reflection direction. The display area Ad is disposed on the curved screen 330.

The holding unit 340 has a headgear 341 and a connection unit 342. The headgear 341 is a fixing member which is fitted to a head. The connection unit 342 is a member which connects the headgear 341 and the projector 320. Though not shown, the curved screen 330 is also connected to the headgear 341 by the connection unit 342. Specifically, the holding unit 340 functions as a fixing unit which fixes the screen and the image projection unit to a user.

Projection light is projected from the projector 320, and forms an image on the curved screen 330. The image is visually observed by the user.

The curved screen 330 has a curved surface shape passing through the points A and B and the sight line center Ce. The points A and B are an upper end (the uppermost point) and a lower end (the lowermost point) of the curved screen 330.

In the image display device 300, with the projector 320 loaded on the head of the viewer, a viewing distance (distance between the view point Pe and the sight line center Ce) is close to a distance of distinct vision (for example, 25, cm). Since the curved screen 330 is fixed to the viewer, the viewing distance is fixed, and the viewing distance does not have to be inputted or detected.

(Other Embodiments)

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the number of wide angle conversion tables T is not limited to four, but can be two, three, or five or more.

Further, the wide angle conversion table may be switched stepwise. For example, when the state in which the wide angle conversion table T1 is selected is shifted to the state in which the wide angle conversion table T3 is selected, the wide angle conversion table T3 is selected by passing through the wide angle conversion table T2. In this manner, abrupt change of the enlargement radio of an image is prevented, and a more natural image can be provided.

In this case, the presently selected wide angle conversion table is stored, and is compared with the wide angle conversion table which should be newly selected. When the new and old wide angle conversion tables have the adjacent characteristics as a result of the comparison, the wide angle conversion table which should be newly selected is directly selected. On the other hand, when a wide angle conversion table having the characteristic between those of the new and old wide angle conversion tables is present, the wide angle conversion table having the intermediate characteristic is selected.

What is claimed is:

1. An image display device, comprising:
a storage unit storing first and second conversion tables respectively expressing relationship of a position on a display area and an enlargement ratio of an image, the enlargement ratio increasing with respect to an increase of a relative distance from a standard position on the display area to a position on the display area, the first conversion table corresponding to an enlargement ratio characteristic having a first enlargement ratio with respect to a first relative distance from the standard position to a first position, and the second conversion table corresponding to an enlargement ratio characteristic having a second enlargement ratio with respect to a second relative distance from the standard position to a second position, and the second enlargement ratio being larger than the first enlargement ratio if the first and second relative distances are equal to each other;
a judging unit judging entire motion of an image;
a selection unit selecting any of the first and second conversion tables based on a result of the judgment; and
a conversion unit converting the image based on the conversion table selected by the selecting unit.

2. The device according to claim 1,
wherein when the judging unit judges that the entire motion of the image including entire moving, the selecting unit selects the second table.

3. The device according to claim 1,
wherein when the judging unit judges that the entire motion of the image including entire enlarging or reducing, the selection unit selects the second and first table respectively in correspondence with a positive and a negative of a difference of a view angle of a viewer with respect to the display area and a predetermined reference value.

4. The device according to claim 1,
wherein the judging unit judges the entire motion of the image based on a motion vector of the image.

5. The device according to claim 1,
wherein the judging unit judges the entire motion of the image based on image pickup information of the image.

6. The device according to claim 5,
wherein the image pickup information includes information of a zoom operation and a pan operation in an image pickup device which pickups the image.

7. The device according to claim 1,
wherein a view angle of a viewer with respect to the display area is 30° or more.

8. The device according to claim 1,
wherein the display area has a first area enclosing a sight line center of a viewer and having a first resolution, and a second area enclosing the first area and having a second resolution lower than the first resolution.

9. The device according to claim 1,
wherein the display area is non-planar.

10. An image display method, comprising:
judging entire motion of an image:
selecting any of first and second conversion tables respectively expressing relationship of a position on a display area and an enlargement ratio of an image, based on a result of the judgment, the enlargement ratio increasing with respect to an increase of a relative distance from a standard position on the display area to a position on the display area, the first conversion table corresponding to an enlargement ratio characteristic having a first enlargement ratio with respect to a first relative distance from the standard position to a first position, and the second conversion table corresponding to an enlargement ratio characteristic having a second enlargement ratio with respect to a second relative distance from the standard position to a second position, and the second enlargement ratio being larger than the first enlargement ratio if the first and second relative distances are equal to each other; and
converting the image based on the selected conversion table.

11. The method according to claim 10,
wherein when it is judged that the image moves entirely in the judging, the second table is selected in the selecting.

12. The method according to claim 10,
wherein when it is judged that the image is entirely enlarged or reduced in the judging, the second and the first tables are selected respectively in correspondence with a positive and a negative of a difference of a view angle of a viewer with respect to the display area and a predetermined reference value in the selecting.

13. The method according to claim 10,
wherein the entire motion of the image is judged in the judging based on a motion vector of the image.

14. The method according to claim 10,
wherein the entire motion of the image is judged in the judging based on image pickup information of the image.

15. The method according to claim 14,
wherein the image pickup information includes information of a zoom operation and a pan operation in a image pickup device which pickups the image.

16. The method according to claim 10,
wherein a view angle of a viewer with respect to the display area is 30° or more.

17. The method according to claim 10,
wherein the display area has a first area enclosing a sight line center of a viewer and having a first resolution, and a second area enclosing the first area and having a second resolution lower than the first resolution.

18. The method according to claim 10,
wherein the display area is non-planar.

* * * * *